United States Patent
Kwon et al.

(10) Patent No.: US 10,316,938 B2
(45) Date of Patent: Jun. 11, 2019

(54) MULTI-STAGE TRANSMISSION FOR VEHICLE

(71) Applicants: Hyundai Motor Company, Seoul (KR); Kia Motors Corporation, Seoul (KR)

(72) Inventors: Hyun Sik Kwon, Seoul (KR); Seong Wook Ji, Gunpo-si (KR); Ki Tae Kim, Incheon (KR); Ju Hyeon Park, Suwon-si (KR); Il Han Yoo, Hwasun-gun (KR); Seong Wook Hwang, Gunpo-si (KR); Won Min Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 69 days.

(21) Appl. No.: 15/827,295

(22) Filed: Nov. 30, 2017

(65) Prior Publication Data

US 2019/0072157 A1 Mar. 7, 2019

(30) Foreign Application Priority Data

Sep. 5, 2017 (KR) .................. 10-2017-0113337

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 9,353,833 B2 * | 5/2016 | Beck | F16H 3/66 |
| 9,587,714 B2 | 3/2017 | Kook et al. | |
| 9,903,445 B2 * | 2/2018 | Kwon | F16H 3/66 |
| 9,945,451 B2 * | 4/2018 | Kwon | F16H 3/66 |
| 10,119,596 B2 * | 11/2018 | Kook | F16H 3/66 |
| 2019/0078655 A1 * | 3/2019 | Yoo | F16H 3/66 |

FOREIGN PATENT DOCUMENTS

| | | | | |
|---|---|---|---|---|
| WO | WO-2013159989 A1 * | 10/2013 | | F16H 3/66 |
| WO | WO-2013159993 A1 * | 10/2013 | | F16H 3/66 |
| WO | WO-2014000939 A1 * | 1/2014 | | F16H 3/666 |

\* cited by examiner

*Primary Examiner* — Dirk Wright
(74) *Attorney, Agent, or Firm* — Morgan, Lewis & Bockius LLP

(57) ABSTRACT

A transmission apparatus may include an input shaft and an output shaft; first to fourth planetary gear devices, each of which is disposed between the input shaft and the output shaft to transfer and has three rotation elements; and six gear-shifting elements connected to the rotation elements of the planetary gear devices, wherein a first rotation element of the first planetary gear device is fixedly connected to a first rotation element of the second planetary gear device, a second rotation element of the first planetary gear device is fixedly connected to a third rotation element of the second planetary gear device and to a third rotation element of the fourth planetary gear device, and a third rotation element of the first planetary gear device is fixedly connected to a third rotation element of the third planetary gear device and to a second rotation element of the fourth planetary gear device.

7 Claims, 2 Drawing Sheets

FIG. 2

| GEAR STAGE | CL1 | CL2 | B1 | B2 | CL3 | CL4 | GEAR RATIO |
|---|---|---|---|---|---|---|---|
| 1ST |  | ● | ● |  | ● |  | 5.314 |
| 2ND |  | ● | ● | ● |  |  | 3.911 |
| 3RD |  | ● |  | ● | ● |  | 2.976 |
| 4TH |  | ● |  | ● |  | ● | 1.902 |
| 5TH | ● | ● |  | ● |  |  | 1.435 |
| 6TH | ● |  |  | ● |  | ● | 1.274 |
| 7TH | ● |  |  |  | ● | ● | 1.000 |
| 8TH | ● |  |  | ● | ● |  | 0.903 |
| 9TH | ● |  | ● |  | ● |  | 0.789 |
| 10TH | ● |  | ● | ● |  |  | 0.581 |
| REV |  | ● | ● |  |  | ● | −4.490 |

MULTI-STAGE TRANSMISSION FOR VEHICLE

CROSS REFERENCE TO RELATED APPLICATION

The present application claims priority of Korean Patent Application No. 10-2017-0113337 filed on Sep. 5, 2017, the entire contents of which is incorporated herein for all purposes by this reference.

BACKGROUND OF THE INVENTION

Field of the Invention

The present invention relates to a multi-stage transmission for a vehicle and, more particularly, to a technology which can implement as many gear stages as possible using as few components as possible and a simple configuration to improve the fuel efficiency of a vehicle.

Description of Related Art

The recent rise in oil prices has caused vehicle manufacturers around the world to enter unlimited competition to improve fuel efficiency. In the case of an engine, vehicle manufacturers are making an effort to reduce the weight of the engine and improve the fuel efficiency thereof using a technology such as downsizing.

Meanwhile, fuel efficiency improvement methods which can be sought for a transmission mounted in a vehicle include a method of increasing the number of gear stages of a transmission to allow an engine to operate at a more efficient operating point to ultimately improve the fuel efficiency of the vehicle.

Furthermore, an increase in the number of gear stages of such a transmission may allow an engine to operate in a relatively low RPM band, further improving the quietness of a vehicle.

However, as the number of gear stages of a transmission increases, the number of internal components configuring the transmission increases, so that the mountability, production costs, weight, and transmission efficiency of the transmission may become rather worse. Therefore, it may be important to design a transmission structure which can achieve maximum efficiency using a small number of components and a relatively simple configuration to maximize a fuel efficiency improvement effect through an increase in the number of gear stages of the transmission.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a multi-stage transmission for a vehicle, which can implement ten forward gears and one backward gear using a relatively small number of components and a relatively simple configuration, so that the transmission can achieve engine operation at an optimum operating point to maximize the improvement of fuel efficiency of the vehicle, and can achieve more quiet engine operation and thus improve the quietness of the vehicle.

In accordance with the above aspect, a multi-stage transmission for a vehicle according to an exemplary embodiment of the present invention may include: an input shaft and an output shaft; a first planetary gear device, a second planetary gear device, a third planetary gear device, and a fourth planetary gear device, each of which is disposed between the input shaft and the output shaft to transfer a rotational force and has three rotation elements; and six gear-shifting elements connected to the rotation elements of the planetary gear devices, wherein a first rotation element of the first planetary gear device is fixedly connected to a first rotation element of the second planetary gear device, a second rotation element of the first planetary gear device is fixedly connected to a third rotation element of the second planetary gear device and to a third rotation element of the fourth planetary gear device, and a third rotation element of the first planetary gear device is fixedly connected to a third rotation element of the third planetary gear device and to a second rotation element of the fourth planetary gear device; the first rotation element of the second planetary gear device is selectively connectable to each of a first rotation element and a second rotation element of the third planetary gear device, a second rotation element of the second planetary gear device is selectively connectable to a transmission housing by one of the gear-shifting elements, and the third rotation element of the second planetary gear device is selectively connectable to the input shaft; the first rotation element of the third planetary gear device is selectively connectable to the transmission housing by another one of the gear-shifting elements, and the second rotation element of the third planetary gear device is fixedly connected to the output shaft; and a first rotation element of the fourth planetary gear device is selectively connectable to the input shaft.

The fourth planetary gear device, the first planetary gear device, the second planetary gear device, and the third planetary gear device may be disposed in order along an axial direction from the input shaft toward the output shaft.

The second rotation element of the second planetary gear device may be selectively connectable to the transmission housing by a first brake among the gear-shifting elements; and the first rotation element of the third planetary gear device may be selectively connectable to the transmission housing by a second brake among the gear-shifting elements.

The third rotation element of the second planetary gear device and the input shaft may be selectively connectable by a first clutch among the gear-shifting elements; the first rotation element of the fourth planetary gear device and the input shaft may be selectively connectable by a second clutch among the gear-shifting elements; the first rotation element of the second planetary gear device and the first rotation element of the third planetary gear device may be selectively connectable by a third clutch among the gear-shifting elements; and the first rotation element of the second planetary gear device and the second rotation element of the third planetary gear device may be selectively connectable by a fourth clutch among the gear-shifting elements.

Furthermore, a multi-stage transmission for a vehicle according to an exemplary embodiment of the present invention may include a first planetary gear device, a second planetary gear device, a third planetary gear device, and a fourth planetary gear device, each of which has three rotation elements; six gear-shifting elements configured to selectively connect rotation shafts thereto; and eight rotation shafts connected to the rotation elements of the planetary gear devices, wherein a first rotation shaft is an input shaft; a second rotation shaft is fixedly connected to a first rotation element of the fourth planetary gear device; a third rotation shaft is fixedly connected to a second rotation element of the first planetary gear device, to a third rotation element of the second planetary gear device, and to a third rotation element of the fourth planetary gear device; a fourth rotation shaft is fixedly connected to a third rotation element of the first planetary gear device, to a third rotation element of the third planetary gear device, and to a second rotation element of the fourth planetary gear device; a fifth rotation shaft is fixedly connected to a first rotation element of the first planetary gear device and to a first rotation element of the second planetary gear device; a sixth rotation shaft is fixedly connected to a second rotation element of the second planetary gear device; a seventh rotation shaft is fixedly connected to a first rotation element of the third planetary gear device; and an eighth rotation shaft corresponds to an output shaft which is fixedly connected to a second rotation element of the third planetary gear device.

The fourth planetary gear device, the first planetary gear device, the second planetary gear device, and the third planetary gear device may be disposed in order along an axial direction from the input shaft toward the output shaft.

Among the six gear-shifting elements, a first brake may be disposed between the sixth rotation shaft and a transmission housing; a second brake may be disposed between the seventh rotation shaft and the transmission housing; a first clutch may be disposed between the first rotation shaft and the third rotation shaft; a second clutch may be disposed between the first rotation shaft and the second rotation shaft; a third clutch may be disposed between the fifth rotation shaft and the seventh rotation shaft; and a fourth clutch may be disposed between the fifth rotation shaft and the eighth rotation shaft.

The present invention can implement ten forward gears and one backward gear using a relatively small number of components and a relatively simple configuration, so that the present invention can achieve engine operation at an optimum operating point to maximize the improvement of fuel efficiency of a vehicle, and can achieve more quiet engine operation and thus improve the quietness of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation mode table illustrating the implementation of each gear stage by the transmission of FIG. 1.

Figure 1:
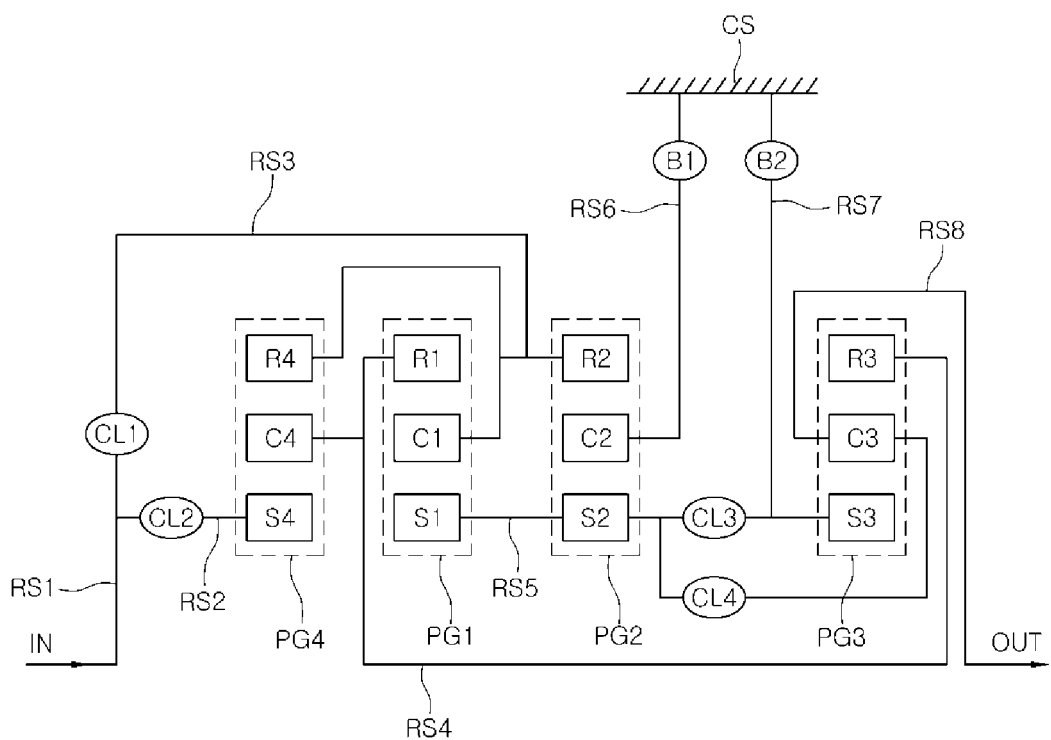
FIG. 1 is a schematic diagram of a multi-stage transmission for a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a multi-stage transmission for a vehicle according to an exemplary embodiment of the present invention may include an input shaft (IN) and an output shaft (OUT); a first planetary gear device (PG1), a second planetary gear device (PG2), a third planetary gear device (PG3), and a fourth planetary gear device (PG4), each of which is disposed between the input shaft (IN) and the output shaft (OUT) to transfer a rotational force and has three rotation elements; and six gear-shifting elements connected to the rotation elements of the planetary gear devices.

A first rotation element (S1) of the first planetary gear device (PG1) is fixedly connected to a first rotation element (S2) of the second planetary gear device (PG2), a second rotation element (C1) of the first planetary gear device (PG1) is fixedly connected to a third rotation element (R2) of the second planetary gear device (PG2) and to a third rotation element (R4) of the fourth planetary gear device (PG4), and a third rotation element (R1) of the first planetary gear device (PG1) is fixedly connected to a third rotation element (R3) of the third planetary gear device (PG3) and to a second rotation element (C4) of the fourth planetary gear device (PG4).

The first rotation element (S2) of the second planetary gear device (PG2) is selectively connectable to each of a first rotation element (S3) and a second rotation element (C3) of the third planetary gear device (PG3), a second rotation element (C2) of the second planetary gear device (PG2) is selectively connectable to a transmission housing (CS) by one of the gear-shifting elements, and the third rotation element (R2) of the second planetary gear device (PG2) is selectively connectable to the input shaft (IN).

The first rotation element (S3) of the third planetary gear device (PG3) is selectively connectable to the transmission housing (CS) by another one of the gear-shifting elements, and the second rotation element (C3) of the third planetary gear device (PG3) is fixedly connected to the output shaft (OUT); and a first rotation element (S4) of the fourth planetary gear device (PG4) is selectively connectable to the input shaft (IN).

As shown in FIG. 1, the fourth planetary gear device (PG4), the first planetary gear device (PG1), the second planetary gear device (PG2), and the third planetary gear device (PG3) are disposed in order along an axial direction from the input shaft (IN) toward the output shaft (OUT).

The second rotation element (C2) of the second planetary gear device (PG2) is selectively connectable to the transmission housing (CS) by a first brake (B1) among the gear-shifting elements, and the first rotation element (S3) of the third planetary gear device (PG3) is selectively connectable to the transmission housing (CS) by a second brake (B2) among the gear-shifting elements.

That is, by the first brake (B1), the second rotation element (C2) of the second planetary gear device (PG2) may be controlled to be either fixedly connected to the transmission housing (CS) or to be maintained in a freely rotatable state. Furthermore, by the second brake (B2), the first rotation element (S3) of the third planetary gear device (PG3) may be controlled to be either fixedly connected to the transmission housing (CS) or to be maintained in a freely rotatable state.

The third rotation element (R2) of the second planetary gear device (PG2) and the input shaft (IN) are selectively connectable by a first clutch (CL1) among the gear-shifting elements. The first rotation element (S4) of the fourth planetary gear device (PG4) and the input shaft (IN) are selectively connectable by a second clutch (CL2) among the gear-shifting elements. The first rotation element (S2) of the second planetary gear device (PG2) and the first rotation element (S3) of the third planetary gear device (PG3) are selectively connectable by a third clutch (CL3) among the gear-shifting elements. The first rotation element (S2) of the second planetary gear device (PG2) and the second rotation element (C3) of the third planetary gear device (PG3) are selectively connectable by a fourth clutch (CL4) among the gear-shifting elements.

The first brake (B1), the second brake (B2), the first clutch (CL1), the second clutch (CL2), the third clutch (CL3), and the fourth clutch (CL4) are all controlled by a controller, which is not shown, according to the operation mode table shown in FIG. 2 in accordance with the running conditions of a vehicle, so that gear stages of ten forward gears and one backward gear of the vehicle may be configured.

When the first brake (B1), the second brake (B2), the first clutch (CL1), the second clutch (CL2), the third clutch (CL3), and the fourth clutch (CL4) are commonly called "gear-shifting elements", during a series of gear stages from a first gear to a tenth gear as shown in FIG. 2, the transmission of the present invention can perform so-called clutch-to-clutch gear shifting, which is performed by engaging of one gear-shifting element while releasing another gear-shifting element.

The first rotation element of the first planetary gear device (PG1) includes a first sun gear (S1), the second rotation element of the first planetary gear device (PG1) includes a first planet carrier (C1), and the third rotation element of the first planetary gear device (PG1) includes a first ring gear (R1). The first rotation element of the second planetary gear device (PG2) includes a second sun gear (S2), the second rotation element of the second planetary gear device (PG2) includes a second planet carrier (C2), and the third rotation element of the second planetary gear device (PG2) includes a second ring gear (R2). The first rotation element of the third planetary gear device (PG3) includes a third sun gear (S3), the second rotation element of the third planetary gear device (PG3) includes a third planet carrier (C3), and the third rotation element of the third planetary gear device (PG3) includes a third ring gear (R3). The first rotation element of the fourth planetary gear device (PG4) includes a fourth sun gear (S4), the second rotation element of the fourth planetary gear device (PG4) includes a fourth planet carrier (C4), and the third rotation element of the fourth planetary gear device (PG4) includes a fourth ring gear (R4).

Furthermore, the multi-stage transmission of the present invention as described above may be referred to as follows. The multi-stage transmission includes: a first planetary gear device (PG1), a second planetary gear device (PG2), a third planetary gear device (PG3), and a fourth planetary gear device, each of which has three rotation elements; six gear-shifting elements configured to selectively connect rotation shafts thereto; and eight rotation shafts connected to the rotation elements of the planetary gear devices.

In the instant case, a first rotation shaft (RS1) is an input shaft (IN). A second rotation shaft (RS2) is fixedly connected to a first rotation element (S4) of the fourth planetary gear device (PG4). A third rotation shaft (RS3) is fixedly connected to a second rotation element (C1) of the first planetary gear device (PG1), to a third rotation element (R2) of the second planetary gear device (PG2), and to a third rotation element (R4) of the fourth planetary gear device (PG4). A fourth rotation shaft (RS4) is fixedly connected to a third rotation element (R1) of the first planetary gear device (PG1), to a third rotation element (R3) of the third planetary gear device (PG3), and to a second rotation element (C4) of the fourth planetary gear device (PG4). A fifth rotation shaft (RS5) is fixedly connected to a first rotation element (S1) of the first planetary gear device (PG1) and to a first rotation element (S2) of the second planetary gear device (PG2). A sixth rotation shaft (RS6) is fixedly connected to a second rotation element (C2) of the second planetary gear device (PG2). A seventh rotation shaft (RS7) is fixedly connected to a first rotation element (S3) of the third planetary gear device (PG3). An eighth rotation shaft (RS8) corresponds to an output shaft (OUT) which is fixedly connected to a second rotation element (C3) of the third planetary gear device (PG3).

The fourth planetary gear device (PG4), the first planetary gear device (PG1), the second planetary gear device (PG2), and the third planetary gear device (PG3) are disposed in order along an axial direction from the input shaft (IN) toward the output shaft (OUT).

Among the six gear-shifting elements, a first brake (B1) is disposed between the sixth rotation shaft (RS6) and a transmission housing (CS); a second brake (B2) is disposed between the seventh rotation shaft (RS7) and the transmission housing (CS); a first clutch (CL1) is disposed between the first rotation shaft (RS1) and the third rotation shaft (RS3); a second clutch (CL2) is disposed between the first rotation shaft (RS1) and the second rotation shaft (RS2); a third clutch (CL3) is disposed between the fifth rotation shaft (RS5) and the seventh rotation shaft (RS7); and a fourth clutch (CL4) is disposed between the fifth rotation shaft (RS5) and the eighth rotation shaft (RS8).

As described above, the multi-stage transmission of the present invention including four simple planetary gear devices and six gear-shifting elements can implement ten forward gears and one backward gear according to the operation mode table shown in FIG. 2, and can implement ten gear stages with a relatively small number of components, a relatively simple configuration, and a small weight, to provide a more optimized gear-shift ratio in the running condition of a vehicle to thus improve the fuel efficiency of the vehicle.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission apparatus for a vehicle, comprising:
an input shaft and an output shaft;
a first planetary gear device, a second planetary gear device, a third planetary gear device, and a fourth planetary gear device, each of which is disposed between the input shaft and the output shaft to transfer a rotational force and has three rotation elements including first, second, and third rotation elements; and
six shifting elements,
wherein the first rotation element of the first planetary gear device is fixedly connected to the first rotation element of the second planetary gear device, the second rotation element of the first planetary gear device is fixedly connected to the third rotation element of the second planetary gear device and to the third rotation element of the fourth planetary gear device, and the third rotation element of the first planetary gear device is fixedly connected to the third rotation element of the third planetary gear device and to the second rotation element of the fourth planetary gear device;
the first rotation element of the second planetary gear device is selectively connectable to each of the first rotation element and the second rotation element of the third planetary gear device, the second rotation element of the second planetary gear device is selectively connectable to a transmission housing by one of the six shifting elements, and the third rotation element of the second planetary gear device is selectively connectable to the input shaft;
the first rotation element of the third planetary gear device is selectively connectable to the transmission housing by another one of the six shifting elements, and the second rotation element of the third planetary gear device is fixedly connected to the output shaft; and
the first rotation element of the fourth planetary gear device is selectively connectable to the input shaft.

2. The transmission apparatus of claim 1, wherein the fourth planetary gear device, the first planetary gear device, the second planetary gear device, and the third planetary gear device are disposed in order along an axial direction from the input shaft toward the output shaft.

3. The transmission apparatus of claim 1, wherein the second rotation element of the second planetary gear device is selectively connectable to the transmission housing by a first brake among the six shifting elements; and the first rotation element of the third planetary gear device is selectively connectable to the transmission housing by a second brake among the six shifting elements.

4. The transmission apparatus of claim 3, wherein the third rotation element of the second planetary gear device and the input shaft are selectively connectable by a first clutch among the six shifting elements, wherein the first brake is the one of the six shifting elements;
the first rotation element of the fourth planetary gear device and the input shaft are selectively connectable by a second clutch among the six shifting elements, wherein the second brake is the another one of the six shifting elements;
the first rotation element of the second planetary gear device and the first rotation element of the third planetary gear device are selectively connectable by a third clutch among the six shifting elements; and
the first rotation element of the second planetary gear device and the second rotation element of the third planetary gear device are selectively connectable by a fourth clutch among the six shifting elements.

5. A transmission apparatus for a vehicle, comprising:
a first planetary gear device, a second planetary gear device, a third planetary gear device, and a fourth planetary gear device, each of which has three rotation elements including first, second, and third rotation elements;
six shifting elements configured to selectively connect rotation shafts thereto; and
eight rotation shafts including first to eighth rotation shafts,
wherein the first rotation shaft is an input shaft;
the second rotation shaft is fixedly connected to the first rotation element of the fourth planetary gear device;
the third rotation shaft is fixedly connected to the second rotation element of the first planetary gear device, to the third rotation element of the second planetary gear device, and to the third rotation element of the fourth planetary gear device;
the fourth rotation shaft is fixedly connected to the third rotation element of the first planetary gear device, to the third rotation element of the third planetary gear device, and to the second rotation element of the fourth planetary gear device;
the fifth rotation shaft is fixedly connected to the first rotation element of the first planetary gear device and to the first rotation element of the second planetary gear device;
the sixth rotation shaft is fixedly connected to the second rotation element of the second planetary gear device;
the seventh rotation shaft is fixedly connected to the first rotation element of the third planetary gear device; and
the eighth rotation shaft corresponds to an output shaft which is fixedly connected to the second rotation element of the third planetary gear device.

6. The transmission apparatus of claim 5, wherein the fourth planetary gear device, the first planetary gear device, the second planetary gear device, and the third planetary gear device are disposed in order along an axial direction from the input shaft toward the output shaft.

7. The transmission apparatus of claim 5, wherein among the six shifting elements, a first brake is disposed between the sixth rotation shaft and a transmission housing;
a second brake is disposed between the seventh rotation shaft and the transmission housing;
a first clutch is disposed between the first rotation shaft and the third rotation shaft;
a second clutch is disposed between the first rotation shaft and the second rotation shaft;
a third clutch is disposed between the fifth rotation shaft and the seventh rotation shaft; and
a fourth clutch is disposed between the fifth rotation shaft and the eighth rotation shaft.

* * * * *